(12) United States Patent
Yoshizawa (10) Patent No.: US 8,482,623 B2
(45) Date of Patent: Jul. 9, 2013

(54) IMAGING DEVICE, IMAGING METHOD, AND RECORDING MEDIUM THAT RECORDS IMAGING PROGRAM THEREIN

(75) Inventor: Kenji Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 65 days.

(21) Appl. No.: 13/300,755

(22) Filed: Nov. 21, 2011

(65) Prior Publication Data

US 2012/0133788 A1  May 31, 2012

(30) Foreign Application Priority Data

Nov. 25, 2010  (JP) ................................ 2010-261949

(51) Int. Cl.
| H04N 3/16 | (2006.01) |
| H04N 5/222 | (2006.01) |
| H04N 5/228 | (2006.01) |
| H04N 5/76 | (2006.01) |
| G06K 9/36 | (2006.01) |
| G06K 9/32 | (2006.01) |
| G09G 5/00 | (2006.01) |

(52) U.S. Cl.
USPC ............ 348/208.99; 348/333.01; 348/333.12; 348/208.4; 348/231.3; 382/287; 382/296; 345/649; 345/659

(58) Field of Classification Search
USPC ............... 348/208.99, 333.01–333.12, 208.1, 348/208.2, 208.4, 208.13, 208.12, 231.3; 382/296, 287; 345/649, 659
See application file for complete search history.

(56) References Cited

U.S. PATENT DOCUMENTS

| 8,004,593 | B2 * | 8/2011 | Kusaka | 348/333.02 |
| 8,085,333 | B2 * | 12/2011 | Kato | 348/333.12 |
| 2004/0165087 | A1 * | 8/2004 | Harada | 348/239 |
| 2009/0027510 | A1 * | 1/2009 | Yumiki | 348/222.1 |
| 2012/0212511 | A1 * | 8/2012 | Miyazawa | 345/659 |

FOREIGN PATENT DOCUMENTS

| JP | 2005-236883 A | 9/2005 |
| JP | 2006-211417 A | 8/2006 |

* cited by examiner

*Primary Examiner* — Nhan T Tran
*Assistant Examiner* — Marly Camargo
(74) *Attorney, Agent, or Firm* — Holtz, Holtz, Goodman & Chick, PC (57) ABSTRACT

An imaging device includes: a reproduce control unit to reproduce an image imaged by an imaging unit in response to an input of an imaging instruction in a case where an attitude determination unit determines that a body of the imaging device has taken a specific attitude; and an inhibition control unit to inhibit the reproduce control unit from reproducing the imaged image, in a case where the attitude determination unit determines that the body of the device has not taken the specific attitude until a predetermined time elapses after the imaging instruction is inputted, even if the body of the imaging device has thereafter taken the specific attitude.

8 Claims, 3 Drawing Sheets

IMAGING DEVICE, IMAGING METHOD, AND RECORDING MEDIUM THAT RECORDS IMAGING PROGRAM THEREIN

BACKGROUND OF THE INVENTION

1. Field of the Invention

The present invention relates to an imaging device, an imaging method, and a recording medium that records an imaging program therein.

2. Description of the Related Art

Heretofore, there has been known an imaging device that, in order to reduce time and trouble for performing an operation input for changing an operation mode, the operation input being made by a user, detects a held attitude of a device body, and changes the operation mode based on the held attitude (for example, refer to Japanese Patent Laid-Open Publication No. 2006-211417 as a patent document).

Incidentally, in the case of the above-described patent document, in order to make setting at a desired operation mode such as a reproduce mode of an image, it is necessary to hold the attitude of the device body for a predetermined time or more in a specific state, and there is a problem that a waiting time occurs until switching is completed from a current operation mode to the desired operation mode.

Note that, though a configuration is adopted so that the operation mode can be automatically changed to an imaging mode after elapse of a predetermined time after the mode is switched to the desired operation mode such as the reproduce mode, in this case, the operation mode is set regardless of an intention of the user, and there is such a problem that it is difficult to use the device concerned.

SUMMARY OF THE INVENTION

According to a first aspect of the present invention, there is provided an imaging device, including: an imaging unit; an operation unit to input an imaging instruction for imaging a subject by the imaging unit; a determination unit to sequentially determine at predetermined timing whether or not a body of the device has taken a specific attitude after the imaging instruction is inputted by the operation unit; a reproduce control unit to reproduce an image imaged by the imaging unit in response to the input of the imaging instruction in a case where the determination unit determines that the body of the device has taken the specific attitude; and an inhibition control unit to inhibit the reproduce control unit from reproducing the imaged image in a case where the determination unit determines that the body of the device has not taken the specific attitude until a predetermined time elapses after the imaging instruction is inputted, even if the body of the device has thereafter taken the specific attitude.

According to a second aspect of the present invention, there is provided an imaging method using an imaging device including an imaging unit and an operation unit to input an imaging instruction for imaging a subject, the imaging being performed by the imaging unit, the imaging method including: determining sequentially at predetermined timing whether or not a body of the device has taken a specific attitude after the imaging instruction is inputted by the operation unit; reproducing an image imaged by the imaging unit in response to the input of the imaging instruction in a case where the body of the device is determined to have taken the specific attitude; and inhibiting the reproduce of the imaged image in a case where the body of the device is determined not to have taken the specific attitude until a predetermined time elapses after the imaging instruction is inputted, even if the body of the device has thereafter taken the specific attitude.

According to a third aspect of the present invention, there is provided a recording medium that records a program allowing a computer in an imaging device including an imaging unit and an operation unit that inputs an imaging instruction for a subject, the imaging being performed by the imaging unit to function as: a determination unit to sequentially determines at predetermined timing whether or not a body of the device has taken a specific attitude after the imaging instruction is inputted by the operation unit; a reproduce control unit to reproduce an image imaged by the imaging unit in response to the input of the imaging instruction in a case where the determination unit determines that the body of the device has taken the specific attitude; and an inhibition control unit to inhibit the reproduce control unit from reproducing the imaged image in a case where the determination unit determines that the body of the device has not taken the specific attitude until a predetermined time elapses after the imaging instruction is inputted, even if the body of the device has thereafter taken the specific attitude.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

A description is made below of specific aspects of the present invention by using the drawings. However, the scope of the invention is not limited to the illustrated example.

In the case where a body of an imaging device 100 of this embodiment takes a specific attitude, the imaging device 100 reproduces and displays an image imaged by an imaging unit 1 in response to an input of an imaging instruction. Moreover, in the case where the body of the imaging device 100 does not take the specific attitude until elapse of a predetermined time after the imaging instruction for a subject is inputted, the imaging device 100 prohibits the reproduce and display of such an imaged image even if the body of the imaging device 100 thereafter takes the specific attitude.

Figure 1:
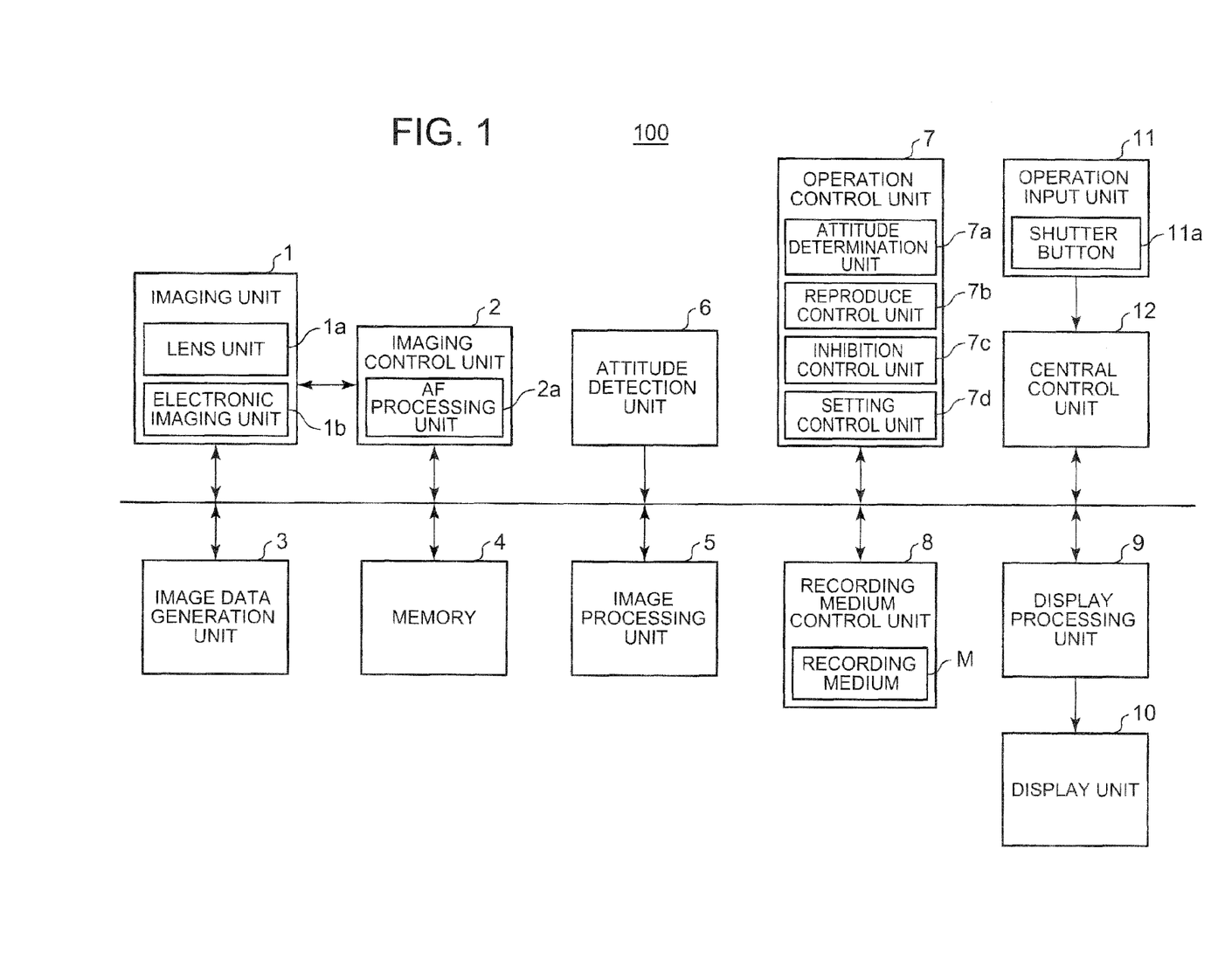
FIG. 1 is a block diagram showing a schematic configuration of an imaging device of an embodiment to which the present invention is applied.

FIG. 1 is a block diagram showing a schematic configuration of an imaging device 100 of an embodiment to which the present invention is applied.

As shown in FIG. 1, specifically, the imaging device 100 includes: an imaging unit 1; an imaging control unit 2; an image data generation unit 3; a memory 4; an image processing unit 5; an attitude detection unit 6; an operation control unit 7; a recording medium control unit 8; a display processing unit; a display unit 10; an operation input unit 11; and a central control unit 12.

As an imaging unit, the imaging unit 1 images a subject, and generates an image frame. Specifically, the imaging unit 1 includes a lens unit 1a and an electronic imaging unit 1b.

The lens unit 1a is composed of a plurality of lenses such as a zoom lens and a focus lens.

For example, the electronic imaging unit 1b is composed of an imaging sensor such as a charge coupled device (CCD) and a complementary metal-oxide semiconductor (CMOS). Moreover, the electronic imaging unit 1b converts an optical image, which has passed though the variety of lenses of the lens unit 1a, into a two-dimensional image signal.

Note that, though not shown, the imaging unit 1 may include a diaphragm that adjusts a quantity of light passing through the lens 1a.

The imaging control unit 2 controls such imaging for the subject by the imaging unit 1. That is to say, though not shown, the imaging control unit 2 includes a timing generator, a driver and the like. Then, the imaging control unit 2 scan-drives the electronic imaging unit 1b by the timing generator and the driver, converts the optical image into the two-dimensional image signal by the electronic imaging unit 1b in every predetermined cycle, reads out the image frame screen by screen from an imaging region of the electronic imaging unit 1b, and outputs the image frame to the image data generation unit 3.

Moreover, the imaging control unit 2 includes an AF processing unit 2a that performs automatic focusing (AF) for adjusting a focal position of the lens unit 1a by moving the focus lens in an optical axis direction.

For example, the AF processing unit 2a includes a drive source such as a focus motor (not shown), the driver (not shown) for driving the drive source in accordance with a control signal from the central control unit 12, and the like. Then, the AF processing unit 2a evaluates a focus state of such an image in the AF area (focal point adjustment region), which is imaged by the imaging unit 1, and drives the drive source by the driver so that the image in the AF area can be focused, thereby moving the focus lens in the optical axis direction. In such a way, the AF processing unit 2a adjusts the focal position of the lens unit 1a (automatic focusing).

Note that the AF processing unit 2a may move the electronic imaging unit 1b in the optical axis direction in place of the lens unit 1a, and thereby may adjust the focal position of the lens unit 1a.

Moreover, the imaging control unit 2 performs adjustment control for conditions, such as automatic exposure (AE) and automatic white balance (AWB), in the event of imaging the subject.

The image data generation unit 3 appropriately performs gain adjustment for such an analog-value signal in the image frame, which is transferred from the electronic imaging unit 1b, for each of color components of R, G and B, and thereafter, performs sample holding for the signal by a sample holding circuit (not shown), and converts the signal into a digital data by an A/D converter (not shown). Then, the image data generation unit 3 performs color process processing including pixel interpolation processing and γ correction processing for the digital data by a color process circuit (not shown), and thereafter, generates digital-value luminance signal Y and color-difference signals Cb and Cr (YUV data).

The luminance signal Y and the color-difference signals Cb and Cr, which are outputted from the color process circuit, are DMA-transferred through a DMA controller (not shown) to the memory 4 to be used as a buffer memory.

For example, the memory 4 is composed of a dynamic random access memory (DRAM) and the like. Moreover, the memory 4 temporarily stores data to be processed by the image data generation unit 3, the image processing unit 3, the attitude detection unit 6, the operation control unit 7, the central control unit 12 and the like.

The image processing unit 5 acquires image data from the memory 4, and performs predetermined image processing for the image data.

The attitude detection unit 6 detects an attitude of the body of the imaging device 100.

That is to say, for example, the attitude detection unit 6 includes a motion detection sensor (not shown) such as an acceleration detection sensor and an angular velocity detection sensor, and based on an output signal from the motion detection sensor, acquires motion information such as a magnitude of a motion to be generated in such a device body. Then, based on the acquired motion information, the attitude detection unit 6 calculates an angle to be made by a straight line extended in the vertical direction and an surface of the imaging device 100 (for example, a front surface on which the lenses are arranged, a back surface on which a display screen of the display unit 10 is exposed, and the like). In such a way, the attitude detection unit 6 detects the attitude of the body of the imaging device 100. Moreover, the attitude detection unit 6 sequentially performs the detection for the attitude of the body of the imaging device 100 at predetermined timing (for example, at an interval of predetermined seconds, and the like).

Note that, for example, the attitude detection unit 6 may define, as a reference attitude, a state where the body of the imaging device 100 is set substantially parallel to the horizontal direction, may determine a rotation amount of the body from the reference attitude while taking a predetermined direction (for example, the horizontal direction and the like) as an axial center, and may detect the attitude of the body of the imaging device 100 in response to the rotation amount.

Moreover, for example, the motion detection sensor may be mounted in the body of the imaging device 100, or may be connected to the body from an outside by a predetermined communication cable.

The operation control unit 7 controls an operation state of the imaging device 100. Specifically, the operation control unit 7 includes an attitude determination unit 7a, a reproduce control unit 7b, an inhibition control unit 7c and a setting control unit 7d.

The attitude determination unit 7a sequentially determines whether or not the body of the imaging device 100a has taken the specific attitude at predetermined timing.

That is to say, after the imaging instruction for the subject is inputted based on a predetermined operation (for example, a full-press operation) for a shutter button 11a of the operation input unit 11 by a user, the attitude determination unit 7a sequentially determines whether or not the body of the imaging device 100 has taken the specific attitude at predetermined timing (for example, at an interval of predetermined seconds, and the like) based on the attitude of the body of the imaging device 100, which is detected by the attitude detection unit 6.

Here, as the specific attitude, for example, there are mentioned a downward facing attitude in which the angle to be made by the straight line extended in the vertical direction and the one surface of the body of the imaging device 100 is a predetermined angle or more, and the like. Moreover, the specific attitude may be defined relatively to the reference attitude of the body of the imaging device 100, and for example, there are mentioned an attitude in which the rotation amount of the body of the imaging device 100 from the reference attitude is a predetermined amount or more, and the like.

As described above, the attitude determination unit 7a composes a determination unit to sequentially determine at the predetermined timing whether or not the body of the imaging device 100 has taken the specific attitude after the imaging instruction is inputted by the operation input unit 11.

The reproduce control unit 7b reproduces and displays, on the display unit 10, a recorded view image of the image imaged by the imaging unit 1.

That is to say, in the case where it is determined by the attitude determination unit 7a that the body of the imaging device 100 has taken the specific attitude, the reproduce control unit 7b allows the display processing unit 9 to generate a video signal related to the recorded view image of the imaged image, and based on the video signal, reproduces and displays the recorded view image on the display screen of the display unit 10.

At this time, the reproduce control unit 7b performs control to reproduce and display the recorded view image of the imaged image only once after elapse of a predetermined time (for example, approximately 1 to 3 seconds, and the like) after the imaging instruction for the subject is inputted based on the predetermined operation for the shutter button 11a of the operation input unit 11 by the user. That is to say, in the case where it is determined by the attitude determination unit 7a that the body of the imaging device 100 has taken the specific attitude until the predetermined time elapses after the imaging instruction is inputted from the operation input unit 11, the reproduce control unit 7b immediately reproduces and displays the recorded view image of the imaged image on the display unit 10.

As described above, the reproduce control unit 7b composes the reproduce control unit to reproduce the image imaged by the imaging unit 1 in response to the input of the imaging instruction in the case where the attitude determination unit 7a determines that the body of the device has taken the specific attitude.

The inhibition control unit 7c inhibits the reproduce and display of the recorded view image of the imaged image, which are controlled by the reproduce control unit 7b.

That is to say, in the case where it is determined by the attitude determination unit 7a that the body of the imaging device 100 has not taken the specific attitude until the predetermined time elapses after the imaging instruction is inputted, the inhibition control unit 7c inhibits the subsequent reproduce and display of the recorded view image of the imaged image, which are controlled by the reproduce control unit 7b.

Specifically, as described above, the attitude determination unit 7a sequentially determines, at the predetermined timing, whether or not the body of the imaging device 100 has taken the specific attitude. In the case where it is determined once by this attitude determination unit 7a that the body of the imaging device 100 has not taken the specific attitude until the predetermined time elapses after the imaging instruction for the subject is inputted based on the predetermined operation for the shutter button 11a of the operation input unit 11 by the user, then even if it is thereafter determined that the body of the imaging device 100 has taken the specific attitude, the inhibition control unit 7c inhibits the reproduce and display of the recorded view image of the imaged image, which are controlled by the reproduce control unit 7b. That is to say, in the case where the predetermined time elapses while the specific attitude is being left untaken by the body of the imaging device 100 after the imaging instruction for the subject is inputted based on the predetermined operation for the shutter button 11a of the operation input unit 11 by the user, then the reproduce and display of the recorded view image of the imaged image, which are controlled by the reproduce control unit 7b, become undone.

As described above, the inhibition control unit 7c composes an inhibition control unit to inhibit the reproduce control unit 7b from reproducing the imaged image in the case where the attitude determination unit 7a determines that the body of the imaging device 100 has not taken the specific attitude until the predetermined time elapses after the imaging instruction is inputted, even if the body of the imaging device 100 has thereafter taken the specific attitude.

The setting control unit 7d controls setting of the operation state of the imaging device 100.

That is to say, in the case where it is determined by the attitude determination unit 7a that the body of the imaging device 100 has taken the specific attitude until the predetermined time elapses after the imaging instruction is inputted from the operation input unit 11, the setting control unit 7d sets, as the operation state, a reproduce state of allowing the reproduce control unit 7b to reproduce and display the recorded view image of the imaged image on the display unit 10. Moreover, in a state where the operation state is the reproduce state, in the case where it is determined that the body of the imaging device 100 has not taken the specific attitude by the attitude determination unit 7a that determines whether or not the body of the imaging device 100 has taken the specific attitude sequentially at the predetermined timing, the setting control unit 7d sets, as the operation state, an imaging preparation state where the imaging of the subject by the imaging unit 1 is performable. Specifically, the setting control unit 7d allows the inhibition control unit 7c to inhibit the reproduce and display of the recorded view image of the imaged image, and sets, as the operation state, the imaging preparation state where it is possible to image the subject by the imaging unit 1. In such a way, the display unit 10 displays a live view image while sequentially updating a plurality of the image frames, which are generated by imaging the subject, at a predetermined frame rate.

Moreover, in the case where it is determined by the attitude determination unit 7a that the body of the imaging device 100 has not taken the specific attitude, and the operation state is switched from the reproduce state to the imaging preparation state, even if it is thereafter determined by the attitude determination unit 7a that the body of the imaging device 100 has taken the specific attitude one more time until the predetermined time elapses as a result that a new imaging instruction for the subject is not inputted, the setting control unit 7d maintains the imaging preparation state without switching the operation state to the reproduce state. That is to say, when it is determined by the attitude determination unit 7a that the body of the imaging device 100 has taken the specific attitude until the predetermined time elapses after the imaging instruction for the subject is inputted based on the predetermined operation for the shutter button 11a of the operation input unit 11 by the user, the setting control unit 7d switches the operation state to the reproduce state. Then, when it is determined by the attitude determination unit 7a that the body of the imaging device 100 has not taken the specific attitude, the setting control unit 7d switches the operation state from the reproduce state to the imaging preparation state. However, when the predetermined operation for the shutter button 11a of the operation input unit 11 by the user is thereafter left undone, even if the body of the imaging device 100 has taken the specific attitude one more time until the predetermined time elapses, the setting control unit 7d maintains the imaging preparation state as the operation state.

As described above, the setting control unit 7d composes an operation setting unit to cause the inhibition control unit 7c to immediately inhibit the reproduce of the imaged image in the case where the attitude determination unit 7a determines that the body of the imaging device 100 has not taken the specific attitude when the operation state is the reproduce state of reproducing the imaged image, and sets, as the operation state, the imaging preparation state where imaging of the subject is performable by the imaging unit 1.

The recording medium control unit 8 is composed so that a recording medium M can be freely attachable thereonto and detachable therefrom. The recording medium control unit 8 controls read of data from the attached recording medium M and write of data to the recording medium M.

That is to say, the recording medium control unit 8 allows the recording medium M to record recording-use image data encoded in accordance with a predetermined compression format (for example, the JPEG format and the like) by an encoding unit (not shown) of the image processing unit 5.

Note that, for example, the recording medium M is composed of a nonvolatile memory (flash memory) and the like; however, the nonvolatile memory is merely an example, and the recording medium M is not limited to this. The recording medium M is changeable appropriately and arbitrarily.

The display processing unit 9 reads out display-use image data temporarily stored in the memory 4, and displays the image data on the display unit 10.

Specifically, the display processing unit 9 includes a video random access memory (VRAM), a VRAM controller, a digital video encoder and the like. Then, under control of the central control unit 12, the digital video encoder periodically reads out the luminance signal Y and the color-difference signals Cb and Cr, which are read out from the memory 4 and are stored in the VRAM (not shown), through the VRAM controller from the VRAM. Then, based on these pieces of data, the digital video encoder generates a video signal, and outputs the video signal to the display unit 10.

For example, the display unit 10 is a liquid crystal display panel, and based on the video signal coming from the display processing unit 9, displays the image imaged by the electronic imaging unit 1b, and the like on the display screen. Specifically, in a still picture imaging mode or a moving picture imaging mode, the display unit 10 displays the live view image while sequentially updating the plurality of image frames, which are generated by imaging the subject by the imaging unit 1 and the imaging control unit 2, at the predetermined frame rate. Moreover, the display unit 10 displays the recorded view image of the imaged image recorded as a still picture, and displays, as a moving picture, an image under recording.

The operation input unit 11 is a unit for performing the predetermined operations of the imaging device 100. Specifically, the operation input unit 11 includes: the shutter button 11a, which is composed so as to be operatable to be half-pressed and full-pressed, and is related to the input of the imaging instruction for the subject; a selection/decision-use button (not shown) related to input of a selection instruction for the operation mode, the function and the like; a zoom button (not shown) related to input of an adjustment instruction for the zoom amount; and the like. Then, the operation input unit 11 outputs predetermined operation signals to the central control unit 12 in response to operations for these buttons.

Here, the operation input unit 11 composes an operation unit to input the imaging instruction for imaging the subject by the imaging unit.

The central processing unit 12 controls the respective units of the imaging device 100. Specifically, though not shown, the central control unit 12 includes a central processing unit (CPU), a random access memory (RAM), a read only memory (ROM) and the like. Then, the central control unit 12 performs a variety of control operations in accordance with a variety of processing programs (not shown) for the imaging device 100.

Figure 2:
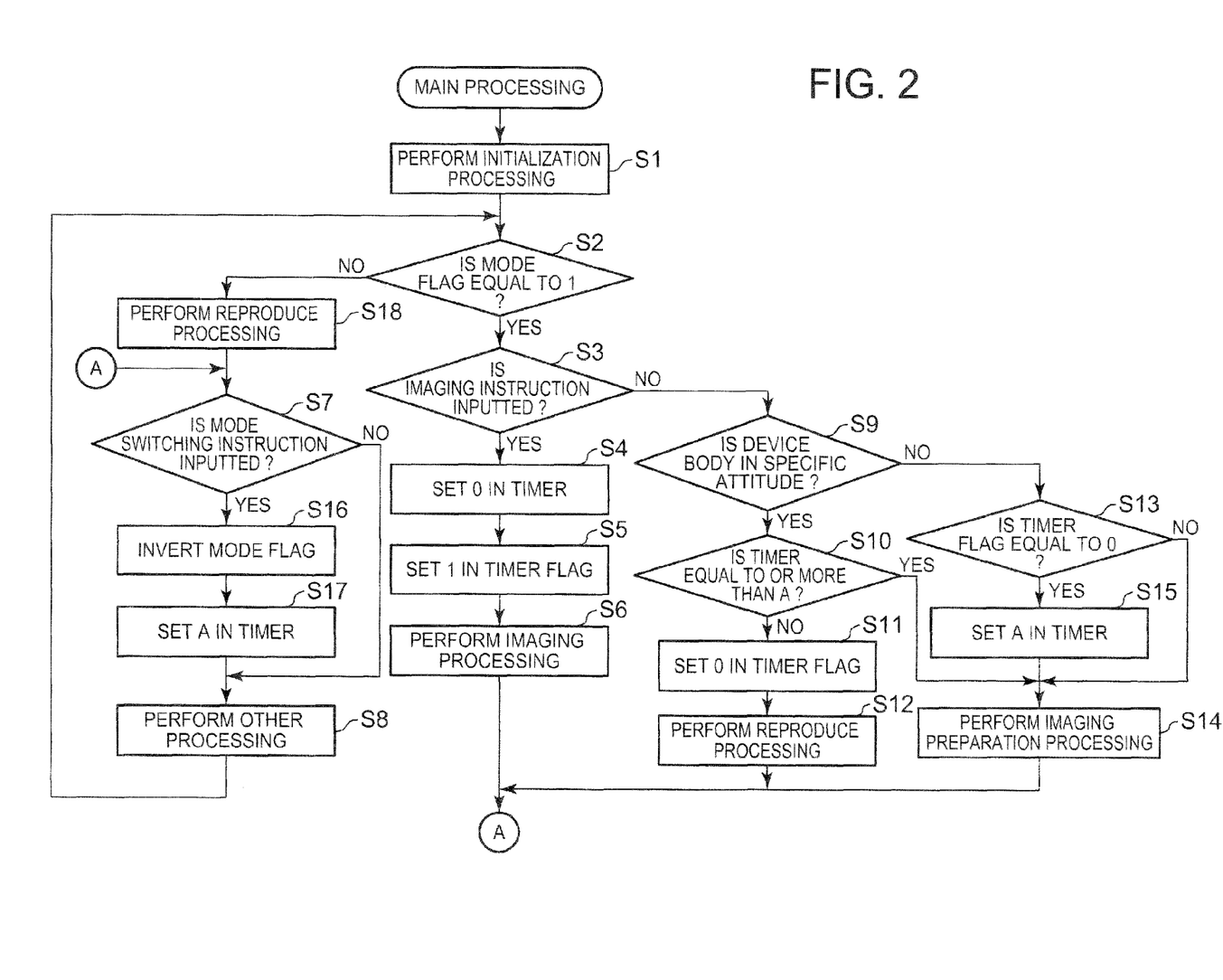
FIG. 2 is a flowchart showing an example of operations related to main processing by the imaging device of FIG. 1.

Next, a description is made of main processing by the imaging device 100 with reference to FIG. 2.

FIG. 2 is a flowchart showing an example of operations related to the main processing.

Note that, in the main processing to be described below, a mode flag is used for determining the operation mode. Moreover, a state where "1" is set in the mode flag is defined as a state where an imaging mode is set as the operation mode, and meanwhile, a state where "0" is set in the mode flag is defined as a state where an image reproduce mode is set as the operation mode.

As shown in FIG. 2, first, the operation control unit 7 initializes a variety of flags and a count value (described later) of a timer, which are stored in the memory 4, (Step S1). Thereafter, the operation control unit 7 determines whether or not the mode flag for determining the operation mode is "1" (Step S2).

Here, if it is determined that the mode flag is "1" (Step S2: YES), then the central control unit 12 determines whether or not the imaging instruction for the subject is inputted based on a predetermined operation (for example, a full-press operation) for the shutter button 11a of the operation control unit 11 by the user (Step S3).

If it is determined in Step S3 that the imaging instruction for the subject is inputted (Step S3: YES), then the operation control unit 7 sets "0" for the count value of the timer for counting an elapsed time from a point of time when the imaging instruction is inputted (Step S4). Thereafter, the operation control unit 7 sets "1" for a timer flag for determining whether or not time counting by the timer is started (Step S5). In such a way, the time counting by the timer is started, and a value of the timer is counted up in timer interruption processing (refer to FIG. 3) to be performed every predetermined time.

Figure 3:
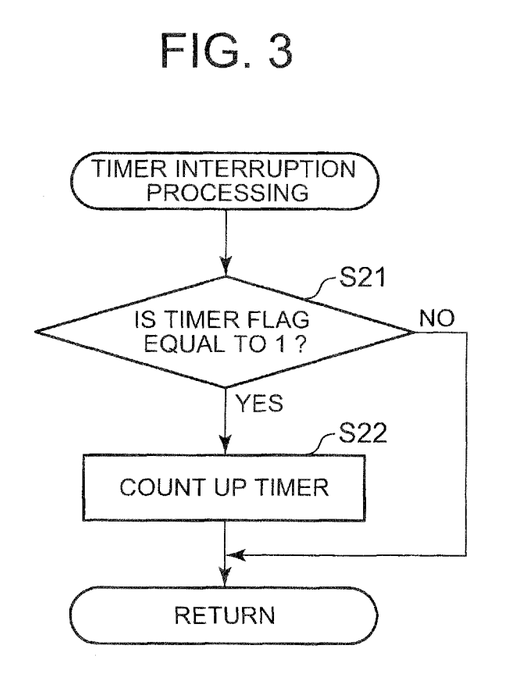
FIG. 3 is a flowchart showing an example of operations related to timer interruption processing by the imaging device of FIG. 1.

Here, a description is made of the timer interruption processing with reference to FIG. 3. FIG. 3 is a flowchart showing an example of operations related to the timer interruption processing.

As shown in FIG. 3, the operation control unit 7 determines whether or not the timer flag is "1" (Step S21).

If it is determined in Step S21 that the timer flag is "1" (Step S21: YES), then the operation control unit 7 counts up the value of the timer (Step S22). Meanwhile, if it is determined in Step S21 that the timer flag is not "1" (Step S21: NO), the operation control unit 7 skips such processing of Step S22 since the timer flag is "0".

Returning to FIG. 2, after the processing of Step S5, the imaging control unit 2 adjusts imaging conditions such as a focal position of the focus lens, exposure conditions (a shutter speed, an aperture, an amplification factor and the like) and a white balance, and allows the electronic imaging unit 1b to image an optical image of a predetermined subject, which has passed through the lens unit 1a (Step S6). Then, the image data generation unit 3 generates YUV data of such an imaged image transferred from the electronic imaging unit 1b. Note that the YUV data of the imaged image is encoded in accordance with the predetermined compression format (for example, the JPEG format and the like) by the encoding unit (not shown) of the image processing unit 5, and thereafter, is transferred to the recording medium control unit 8, and is recorded in the recording medium M.

Subsequently, based on a predetermined operation for a selection decision-use button of the operation input unit 11, the central control unit 12 determines whether or not a switching instruction for the operation mode is inputted (Step S7).

Here, if it is determined that the switching instruction for the operation mode is not inputted (Step S7: NO), then the operation control unit 7 executes various pieces of processing (other pieces of processing) other than those described in detail in the main processing of FIG. 2 (Step S8), and thereafter shifts the processing to Step S2. Then, in a similar way to the above, the operation control unit 7 determines whether or not the mode flag for determining the operation mode is "1" (Step S2).

In Step S2, the value of the mode flag is not changed, and accordingly, it is determined that the mode flag is "1" (Step S2: YES), and the central control unit 12 shifts the processing to Step S3, and determines whether or not the imaging instruction for the subject is inputted based on the predetermined operation for the shutter button 11a of the operation control unit 11 by the user (Step S3).

If it is determined in Step S3 that the imaging instruction for the subject is not inputted (Step S3: NO), then based on the attitude of the body of the imaging device 100, which is detected by the attitude detection unit 6, the attitude determination unit 7a determines whether or not the body of the imaging device 100 has taken the specific attitude (for example, the downward facing attitude) (Step S9).

If it is determined in Step S9 that the body of the imaging device 100 has taken the specific attitude (Step S9: YES), then the operation control unit 7 determines whether or not the count value of the time is a predetermined time "A" or more (Step S10).

Here, if is determined that the count value of the timer is not the predetermined time "A" or more (Step S10: NO), then the operation control unit 7 sets "0" in the timer flag (Step S11). In such a way, the time counting by the timer is stopped.

Subsequently, the reproduce control unit 7b performs reproduce processing for the recorded view image of the image imaged by the imaging unit 1 (Step S12). Specifically, the reproduce control unit 7b allows the display processing unit 9 to generate the video signal related to the recorded view image of the imaged image, and based on the video signal, reproduces and displays the recorded view image on the display screen of the display unit 10.

Thereafter, the central control unit 12 shifts the processing to Step S7, and executes the subsequent processing.

Meanwhile, if it is determined in step S9 that the body of the imaging device 100 has not taken the specific attitude (Step S9: NO), the operation control unit 7 determines whether or not the timer flag is "0" (Step S13).

Here, if it is determined that the timer flag is not "0" (Step S13: NO), the operation control unit 7 performs imaging preparation processing for preparing the imaging of the subject by the imaging unit 1 (Step S14). Specifically, the setting control unit 7d of the operation control unit 7 sets, as the operation state, the imaging preparation state where it is possible to image the subject by the imaging unit 1, and the display processing unit 9 displays the live view image on the display unit 10 while sequentially updating the plurality of image frames, which are generated by imaging the subject, at the predetermined frame rate. That is to say, in the case where the body of the imaging device 100 has not taken the specific attitude, the reproduce processing (Step S12) for the recorded view image of the imaged image, which is controlled by the reproduce control unit 7b, is not performed.

Thereafter, the central control unit 12 shifts the processing to Step S7, and executes the subsequent processing.

Moreover, after it is determined by the attitude determination unit 7a that the body of the imaging device 100 has taken the specific attitude in Step S9 (Step S9: YES), in the case where it is determined by the operation control unit 7 that the count value of the timer is the predetermined time "A" or more in Step S10 (Step S10: YES), then the central control unit 12 shifts the processing to Step S14, the inhibition control unit 7c of the operation control unit 7 inhibits the reproduce and display of the recorded view image of the imaged image, which are controlled by the reproduce control unit 7b, and the setting control unit 7d sets, as the operation state, the imaging preparation state where it is possible to image the subject by the imaging unit 1.

That is to say, even in the case where the body of the imaging device 100 has taken the specific attitude, in the case where the predetermined time elapses after the imaging instruction for the subject is inputted based on the predetermined operation for the shutter button 11a of the operation input unit 11 by the user, that is, in the case where the predetermined time elapses while the specific attitude is being left untaken by the body of the imaging device 100 after the imaging instruction for the subject is inputted, the reproduce processing (Step S12) for the recorded view image of the imaged image, which is controlled by the reproduce control unit 7b, is not performed even if the body of the imaging device 100 thereafter takes the specific attitude. Note that, in the case where the predetermined time elapses while the specific attitude is being left untaken by the body of the imaging device 100 after the imaging instruction for the subject is inputted, the inhibition control unit 7c may simply inhibit the reproduce and the display without performing the subsequent determination for the attitude of the body of the imaging device 100, which is made by the attitude determination unit 7a, at all.

Meanwhile, if it is determined in Step S13 that the timer flag is "0" (Step S13: YES), the operation control unit 7 sets the predetermined time "A" in the count value of the timer (Step S15). Thereafter, the operation control unit 7 performs the imaging preparation processing for preparing the imaging of the subject by the imaging unit 1 (Step S14).

That is to say, by the fact that it is determined by the operation control unit 7 that the count value of the timer is not the predetermined time "A" or more in Step S10 (Step S10: NO), "0" is set in the timer flag by the operation control unit 7 in Step S11. Then, after it is determined by the attitude determination unit 7a that the body of the imaging device 100 has not taken the specific attitude in Step S9 (Step S9: NO), it is determined that the timer flag is "0" in Step S13 (Step S13: YES). Then in this case, the operation control unit 7 sets the predetermined time "A" in the count value of the timer (Step S15).

In such a way, even in the case where it is thereafter determined by the attitude determination unit 7a that the body of the imaging device 100 has taken the specific attitude in Step S9 (Step S9: YES), then in Step S10, it comes not to be determined by the operation control unit 7 that the count value of the timer is not the predetermined time "A" or more (Step S10: NO). That is to say, even if the body of the imaging device 100 has taken the specific attitude one more time until the predetermined time elapses after the imaging instruction for the subject is inputted, the setting control unit 7d maintains the imaging preparation state without switching the operation state to the reproduce state.

Meanwhile, if it is determined in Step S7 that the switching instruction for the operation mode is inputted (Step S7: YES), then the operation control unit 7 inverts the value of the mode flag for determining the operation mode (Step S16). That is to say, the operation control unit 7 sets "0" in the mode flag in which the value is set at "1".

Subsequently, the operation control unit 7 sets the predetermined time "A" in the count value of the timer (Step S17). Thereafter, the central control unit 12 shifts the processing to Step S8, executes various pieces of processing (other pieces of processing) other than those described in detail in the main processing of FIG. 2 (Step S8), and thereafter shifts the processing to Step S2.

In Step S2, it is determined by the operation control unit 7 that the mode flag for determining the operation mode is not "1" (Step S2), and the reproduce control unit 7b performs reproduce processing for the recorded view image of the image imaged by the imaging unit 1 (Step S18). Specifically, the reproduce control unit 7b allows the display control unit 9 to generate the video signal related to the recorded view image of the imaged image, and reproduces and displays the recorded view image on the display screen of the display unit 10 based on the video signal. Note that, in this reproduce processing in Step S18, other recorded image than the recorded view image of the imaged image recorded in the recording medium M may be switched at predetermined timing and may be reproduced and displayed on the display screen of the display unit 10.

Thereafter, the central control unit 12 shits the processing to Step S7, and executes the subsequent processing.

Note that, in Step S17, the predetermined time "A" is set in the count value of the timer by the operation control unit 7. Accordingly, even in the case where it is thereafter determined one more time that the switching instruction for the operation mode is inputted by the central control unit 12 in Step S7 (Step S7: YES), the value of the mode flag is inverted one more time by the operation control unit 7 in step S16, and thereafter in Step S9, it is determined by the attitude determination unit 7a that the body of the imaging device 100 has taken the specific attitude (Step S9: YES), then it comes not to be determined by the operation control unit 7 that the count value of the timer is not the predetermined time "A" or more in Step S10 (Step S10: NO). That is to say, even if, at the time of the reproduce state after the body of the imaging device 100 has taken the specific attitude until the predetermined time elapses after the imaging instruction for the subject is inputted, the setting control unit 7d switches the operation mode once, and thereafter, switches the operation mode one more time, then the setting control unit 7d switches the operation mode to the imaging preparation state without maintaining the operation sate in the reproduce state.

As described above, in accordance with the imaging device 100 of this embodiment, in the case where the body of the imaging device 100 has taken the specific attitude, the recorded view image of the image imaged by the imaging unit 1 is immediately reproduced and displayed. Accordingly, a waiting time is prevented from occurring at the time of setting the imaging device 100 at the operation state of reproducing and displaying the recorded view image of the imaged image. In particular, if it is the time until the predetermined time elapses after the imaging instruction for the subject is inputted, then in the case where the body of the imaging device 100 has taken the specific attitude, the recorded view image of the imaged image can be immediately reproduced and displayed only once.

Moreover, in the case where the body of the imaging device 100 has not taken the specific attitude until the predetermined time elapses after the imaging instruction for the subject is inputted, even if the body of the imaging device 100 has thereafter taken the specific attitude, the reproduce and display of the recorded view image of the imaged image is inhibited. Accordingly, after the predetermined time elapses while the specific attitude is being left untaken by the body of the imaging device 100 after the imaging instruction for the subject is inputted, it is determined that the user does not have an intention to confirm the recorded view image of the imaged image, whereby the recorded view image of the imaged image can be prevented from being reproduced and displayed.

Hence, the setting of the operation state can be made appropriately and rapidly in consideration of the intention of the user, which corresponds to the attitude of the body of the imaging device 100.

Moreover, if it is determined that the body of the imaging device 100 has not taken the specific attitude when the operation state is the reproduce state of reproducing and displaying the recorded view image of the imaged image, then the reproduce and display of the recorded view image of the imaged image are inhibited, and as the operation state, the imaging preparation state where it is possible to image the subject is set. Accordingly, even if the recorded view image of the imaged image is under reproduce and display, it is determined that the user does not have an intention to visually recognize the recorded view image of the imaged image based on the fact that the body of the imaging device 100 has not taken the specific attitude, whereby the imaging preparation state where it is possible to image the subject can be set immediately.

Furthermore, even if it is thereafter determined that the body of the imaging device 100 has taken the specific attitude until the predetermined time elapses after the imaging instruction for the subject is inputted, the imaging preparation state is maintained without switching the operation state to the reproduce state. Accordingly, it is determined that the user has an intention to image the subject in a state where the body of the imaging device 100 is set in the specific attitude, whereby the imaging preparation state where it is possible to image the subject can be maintained.

As described above, such an appropriate operation state that considers the intention of the user in response to the attitude of the body of the imaging device 100 can be set.

Note that the present invention is not limited to the above-described embodiment, and may perform varieties of improvements and design changes within the scope without departing from the spirit of the present invention.

For example, in the above-described embodiment, in the case where the shutter button 11a of the operation input unit 11 is operated to be half-pressed by the user when the operation state is the reproduce state of reproducing the imaged image, the setting control unit 7d may set the imaging preparation state as the operation state.

That is to say, in the case where the shutter button 11a of the operation input unit 11 is operated to be half-pressed by the user after the reproduce state is set as the operation state, the setting control unit 7d sets the imaging preparation state as the operation state. Specifically, if it is determined by the attitude determination unit 7a that the body of the imaging device 100 has taken the specific attitude until the predetermined time elapses after the imaging instruction for the subject is inputted based on the predetermined operation for the shutter button 11a of the operation input unit 11 by the user, then the setting control unit 7d switches the operation state to the reproduce state. Thereafter, when the shutter button 11a of the operation input unit 11 is operated to be half-pressed by the user, the setting control unit 7d allows the inhibition control unit 7c to inhibit the reproduce and display of the recorded view image of the imaged image, and then switches the operation state to the imaging preparation state where it is possible to image the subject by the imaging unit 1.

Hence, when the operation state is the reproduce state of reproducing the recorded view image of the imaged image, if the shutter button 11a of the operation input unit 11 is operated to be half-pressed by the user, then the imaging preparation state is set as the operation state. Accordingly, even if the recorded view image of the imaged image is under reproduce and display, it is determined that the user does not have the intention to visually recognize the recorded view image of the imaged image based on the half-press operation for the shutter button 11a of the operation input unit 11, whereby the imaging preparation state where it is possible to image the subject can be set immediately.

At this time, when the operation state is switched (set) by the setting control unit 7d to the imaging preparation state where the imaging of the subject is performable, the AF processing unit 2a as a focusing unit may perform the automatic focusing for adjusting the focal position of the lens unit 1a. In such a way, it is determined that the user has the intention to image the subject based on the half-press operation for the shutter button 11a of the operation input unit 11, whereby the adjustment of the focal position of the imaging unit 1 can be performed.

As described above, such an appropriate operation state that considers the intention of the user in response to the half-press operation for the shutter button 11a of the operation input unit 11 of the imaging device 100 can be set.

Moreover, in the above-described embodiment, in the case where the operation state is switched from the reproduce state to the imaging preparation state, even if it is determined that the body of the imaging device 100 has taken the specific attitude until the predetermined time elapses after the imaging instruction for the subject is inputted, the imaging preparation state is maintained without switching the operation state to the reproduce state. However, the present invention is not limited to this, and in the case where the body of the imaging device 100 has taken the specific attitude, the operation state may be switched to the reproduce state any number of times, and the recorded view image of the image imaged by the imaging unit 1 may be reproduced and displayed.

At this time, when the shutter button 11a of the operation input unit 11 is operated to be half-pressed by the user, the imaging preparation state may be set as the operation state. In such a way, it is determined that the user has the intention to image the subject in the state where the body of the imaging device 100 is set in the specific attitude based on the half-press operation for the shutter button 11a of the operation input unit 11, whereby the subject can be imaged immediately.

Note that, in the above-described embodiment, in the case where the subject is imaged in the state where the body of the imaging device 100 has taken the specific attitude, it is determined in Step S9 of the main processing (refer to FIG. 2) that the body of the imaging device 100 has taken the specific attitude (Step S9: YES), and in Step S12, such a problem occurs that the reproduce processing for the recorded view image of the imaged image is performed. In this connection, in the case of imaging the subject in the specific attitude, a predetermined flag for imaging the subject in the specific attitude is set, or an imaging mode in the specific attitude is set, whereby the reproduce processing for the recorded view image of the imaged image may be prevented from being automatically performed. Moreover, in the main processing, the attitude of the body of the imaging device 100, which is detected by the attitude detection unit 6, is sequentially stored in the memory 4 and the like at every predetermined time interval. Then, in the case where it is determined that the attitude of the body of the imaging device 100 is held in the specific attitude for a predetermined time or more, it is determined that the user is adjusting his/her composition while holding the body of the imaging device 100 in the specific attitude, whereby the reproduce processing for the recorded view image of the imaged image may be prevented from being automatically performed after the subject is imaged.

Moreover, the configuration of the imaging device 100, which is illustrated in the above-described embodiment, is merely an example, and the present invention is not limited to this. For example, the setting control unit 7d that controls the setting for the operation state of the imaging device 100 is provided; however, it is possible to appropriately and arbitrarily change whether or not to provide the setting control unit 7d.

In addition, in the above-described embodiment, the configuration is adopted, in which the functions as the determination unit, the reproduce control unit and the inhibition control unit are realized in such a manner that the attitude determination unit 7a, reproduce control unit 7b and inhibition control unit 7c of the operation control unit 7 are driven under the control of the central processing unit 12. However, the present invention is not limited to this, and a configuration may be adopted, in which these functions are realized in such a manner that a predetermined program and the like are executed by the central processing unit 12.

That is to say, in a program memory (not shown) that stores programs, a program including a determination processing routine, a reproduce control processing routine and an inhibition control processing routine is stored in advance. Then, by the determination processing routine, the CPU of the central control unit 12 may be allowed to function as the determination unit that determines sequentially at predetermined timing whether or not the body of the device has taken the specific attitude after the imaging instruction is inputted by the operation unit. Moreover, by the reproduce control processing routine, the CPU of the central control unit 12 may be allowed to function as the reproduce control unit that allows the reproduce of the image imaged by the imaging unit in response to the input of the imaging instruction in the case where it is determined by the determination unit that the body of the device has taken the specific attitude. Furthermore, by the inhibition control processing routine, the CPU of the central control unit 12 may be allowed to function as the inhibition control unit that, in the case where it is determined by the determination unit that the body of the device has not taken the specific attitude until the predetermined time elapses after the imaging instruction is inputted, even if the body of the device has thereafter taken the specific attitude, inhibits the reproduce of the imaged image, which is controlled by the reproduce control unit.

In a similar way, a configuration may be adopted, in which the operation setting unit and the focusing unit are realized in such a manner that a predetermined program and the like are executed by the CPU of the central control unit 12.

Furthermore, besides a ROM, a hard disk and the like, as a computer-readable medium that stores the program for executing the above-described respective pieces of processing, it is also apply a nonvolatile memory such as a flash memory, and a portable recording medium such as a CD-ROM. Moreover, as a medium that provides data of the programs through a predetermined communication line, a carrier wave is also applied.

The entire disclosure of Japanese Patent Application No. 2010-261949 filed on Nov. 25, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

The invention claimed is:

1. An imaging device including an imaging unit, the device comprising:
   an operation unit to input an imaging instruction for imaging a subject by the imaging unit;
   a determination unit to sequentially determine at a predetermined timing whether or not a body of the device has taken a specific attitude after the imaging instruction is inputted by the operation unit;
   a reproduction control unit to reproduce an image imaged by the imaging unit in response to the input of the imaging instruction in a case in which the determination unit determines that the body of the device has taken the specific attitude; and
   an inhibition control unit to inhibit the reproduction control unit from reproducing the imaged image in a case in which the determination unit determines that the body of the device has not taken the specific attitude during a predetermined time after the imaging instruction is inputted, even if the body of the device has thereafter taken the specific attitude.

2. The imaging device according to claim 1, wherein the reproduction control unit immediately reproduces the imaged image in a case in which the determination unit determines that the body of the device has taken the specific attitude by the time at which the predetermined time elapses.

3. The imaging device according to claim 1, further comprising:
   an operation setting unit to cause the inhibition control unit to immediately inhibit the reproduction of the imaged image in a case in which the determination unit determines that the body of the device has not taken the specific attitude when an operation state is a reproducing state of reproducing the imaged image, and sets, as the operation state, an imaging preparation state in which the imaging of the subject is performable.

4. The imaging device according to claim 3, wherein the operation setting unit maintains the imaging preparation state without switching the operation state to the reproducing state, even if the determination unit determines that the body of the device has taken the specific attitude by the time at which the predetermined time elapses when a new imaging instruction is not inputted after the operation state is switched and set from the reproducing state to the image preparation state.

5. The imaging device according to claim 3, wherein the operation unit is operatable to be half-pressed, and
   wherein when the operation setting unit is operated to be half-pressed by the operation unit when the operation state is the reproducing state, the operation setting unit sets the imaging preparation state as the operation state.

6. The imaging device according to claim 5, further comprising:
   a focusing unit to adjust a focal point of the imaging unit when the operation state is set by the operation setting unit to the imaging preparation state.

7. An imaging method using an imaging device including an imaging unit and an operation unit to input an imaging instruction for imaging a subject, the imaging being performed by the imaging unit, the imaging method comprising:
   determining sequentially at a predetermined timing whether or not a body of the device has taken a specific attitude after the imaging instruction is inputted by the operation unit;
   reproducing an image imaged by the imaging unit in response to the input of the imaging instruction in a case in which the body of the device is determined to have taken the specific attitude; and
   inhibiting the reproduction of the imaged image in a case in which the body of the device is determined not to have taken the specific attitude during a predetermined time after the imaging instruction is inputted, even if the body of the device has thereafter taken the specific attitude.

8. A non-transitory recording medium that records a program allowing a computer in an imaging device including an imaging unit and an operation unit that inputs an imaging instruction for a subject, the imaging being performed by the imaging unit, to perform a process comprising:
   sequentially determining at a predetermined timing whether or not a body of the device has taken a specific attitude after the imaging instruction is inputted by the operation unit;
   reproducing an image imaged by the imaging unit in response to the input of the imaging instruction in a case in which it is determined that the body of the device has taken the specific attitude; and
   inhibiting reproduction of the imaged image in a case in which it is determined that the body of the device has not taken the specific attitude during a predetermined time after the imaging instruction is inputted, even if the body of the device has thereafter taken the specific attitude.

* * * * *